(No Model.) 4 Sheets—Sheet 1.
A. L. LINEFF & W. JONES.
FIELD COOKING APPARATUS FOR MILITARY AND OTHER PURPOSES.
No. 352,651. Patented Nov. 16, 1886.
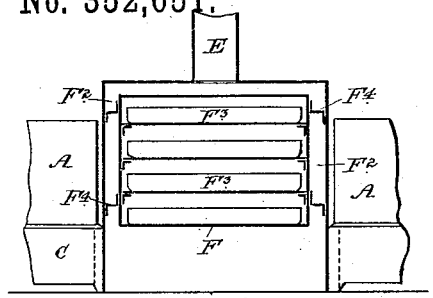
Fig. 4ᵃ Fig. 1.
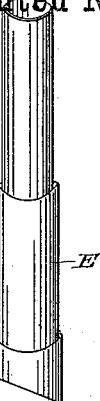
Fig. 1ᵃ
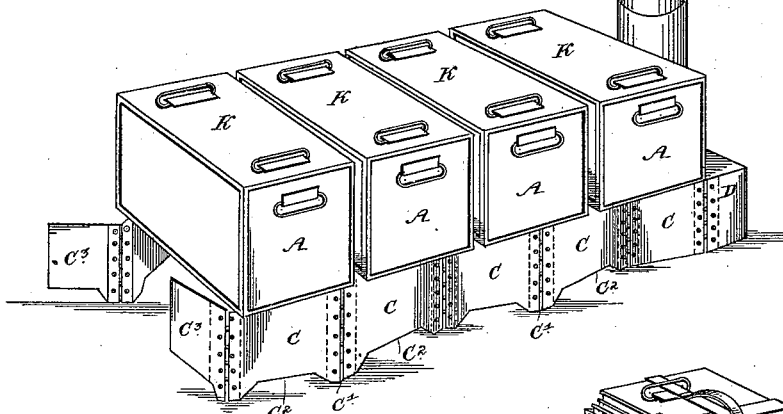
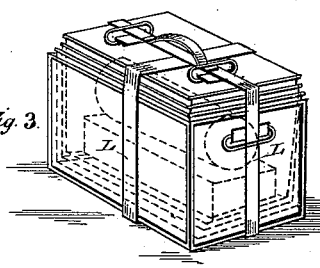
Fig. 3.
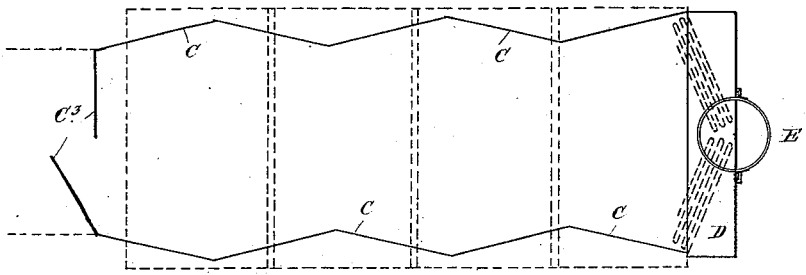
Fig. 2.
Attest:—
C. M. Gallaher
Paul M. Knobloch
Inventors:—
Alexander L. Lineff
William Jones
per Henry Orth
their atty (No Model.) 4 Sheets—Sheet 2.

A. L. LINEFF & W. JONES.
FIELD COOKING APPARATUS FOR MILITARY AND OTHER PURPOSES.

No. 352,651. Patented Nov. 16, 1886.

(No Model.) 4 Sheets—Sheet 3.
A. L. LINEFF & W. JONES.
FIELD COOKING APPARATUS FOR MILITARY AND OTHER PURPOSES.
No. 352,651. Patented Nov. 16, 1886.
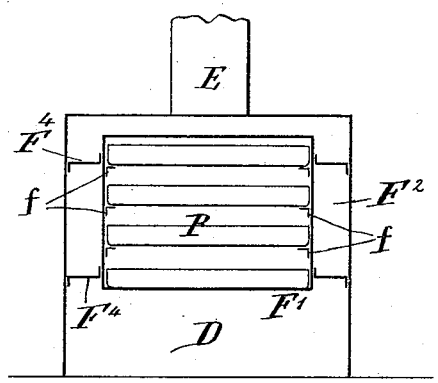
Fig. 4ᵇ
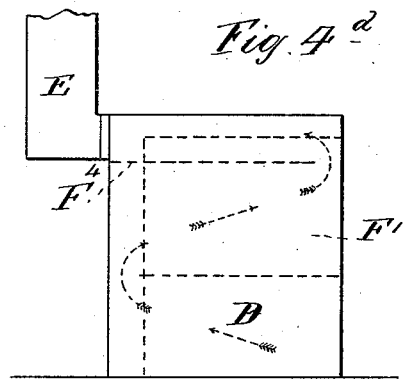
Fig. 4ᵈ
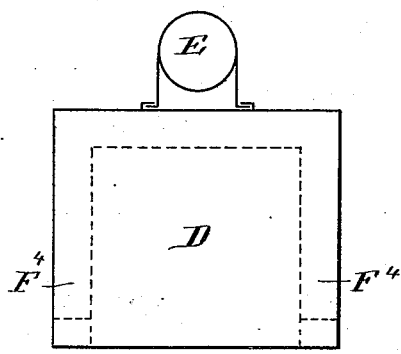
Fig. 4ᶜ
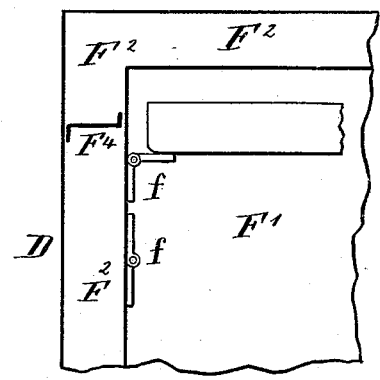
Fig. 4ᵉ
Witnesses
W. E. Poulter
P. M. Knobloch
Inventors
A. L. Lineff
Wm Jones
by Henry Orth
their atty (No Model.) 4 Sheets—Sheet 4.

A. L. LINEFF & W. JONES.
FIELD COOKING APPARATUS FOR MILITARY AND OTHER PURPOSES.

No. 352,651. Patented Nov. 16, 1886.

Attest:
C. Mc Gallahu
Paul M. Knobloch.

Inventors:
Alexander L. Lineff
William Jones
per Henry Orth
their atty

UNITED STATES PATENT OFFICE.

ALEXANDER LOGIN LINEFF AND WILLIAM JONES, OF LONDON, ENGLAND.

FIELD COOKING APPARATUS FOR MILITARY AND OTHER PURPOSES.

SPECIFICATION forming part of Letters Patent No. 352,651, dated November 16, 1886.

Application filed July 28, 1885. Serial No. 172,878. (No model.) Patent d in Eng'and March 2, 1885, No. 2,743.

*To all whom it may concern:*

Be it known that we, ALEXANDER LOGIN LINEFF and WILLIAM JONES, both subjects of the Queen of England, residing at London, England, have invented new and useful Improvements in Field Cooking Apparatus for Military and other Purposes, (for which we have obtained Letters Patent in Great Britain, No. 2,743, dated March 2, 1885,) of which the following is a specification.

Figure 4:
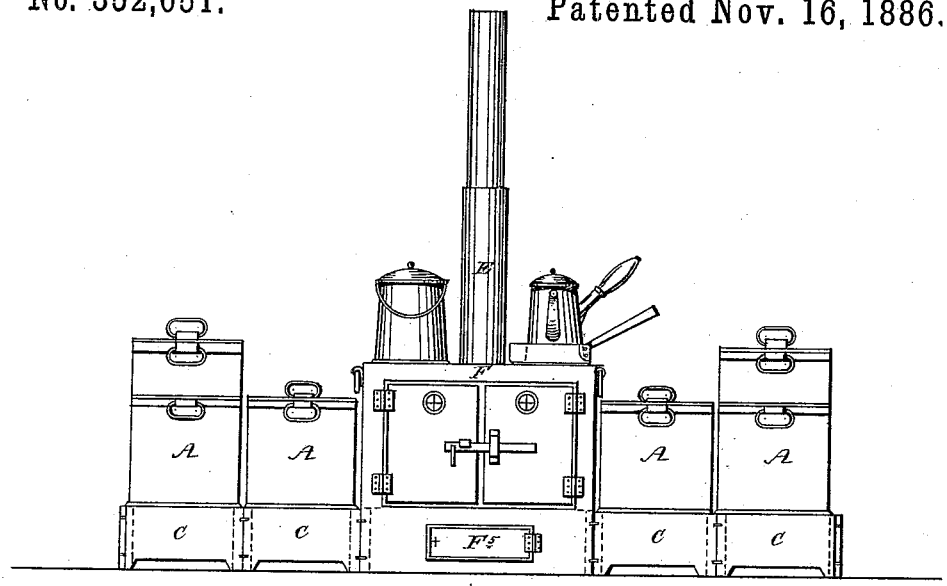
Figure 5:
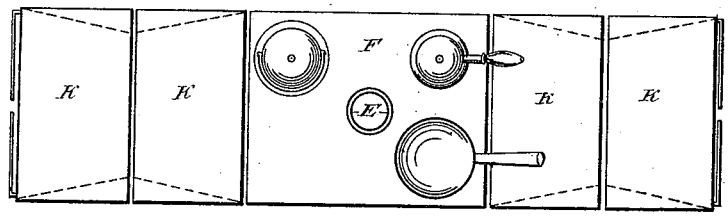
Figure 6:
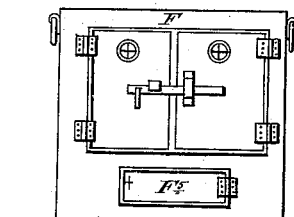
Figure 7:
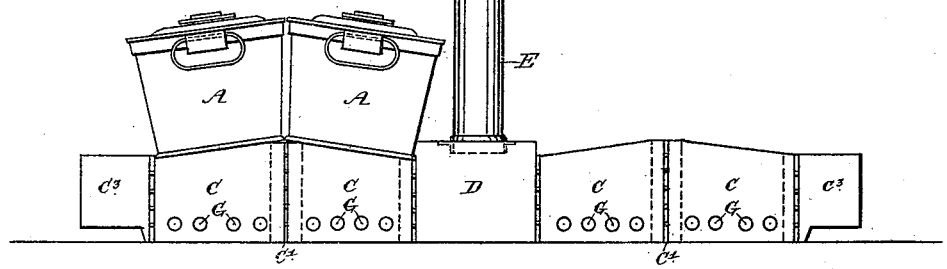
Figure 9:
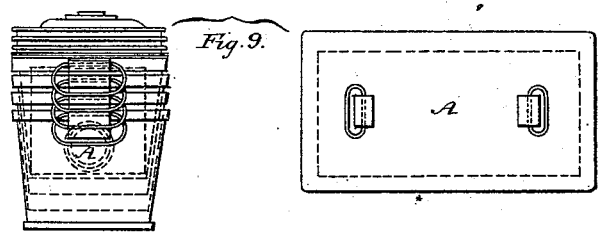
Figure 8:
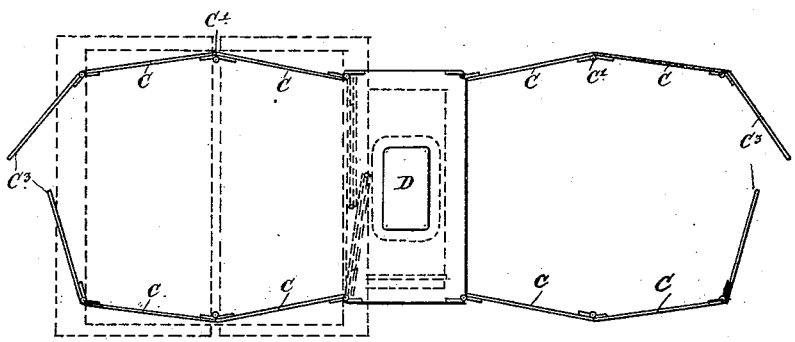

Referring to the accompanying drawings, Figure 1 is an isometric view of one form of our improved apparatus. Fig. 1ª is a like detail of the upper part of the sectional or telescopic chimney, showing a wind-guard applied thereto. Fig. 2 is a diagrammatic plan view of the apparatus shown in Fig. 1. Fig. 3 is an isometric view of the said apparatus as it appears when packed for transportation. Fig. 4 is a front elevation of our improved apparatus arranged for use with two fires and provided with an oven on the smoke-box. Fig. 4ª is a vertical longitudinal section of the smoke-box and oven shown in Fig. 4, showing a portion of the trench-plates and cooking-vessels on opposite sides thereof in elevation. Fig. 4ᵇ is a like view of the smoke-box and oven detached. Fig. 4ᶜ is a top plan view, and Fig. 4ᵈ a vertical transverse section, of the smoke-box and oven; and Fig. 4ᵉ is a front vertical longitudinal section thereof, to more clearly illustrate the means for supporting the baking-pans. Fig. 5 is a top plan view of Fig. 4. Fig. 6 is a front elevation of the smoke-box and oven, in which the remaining portions of the apparatus are inclosed for transportation. Fig. 7 shows in front elevation a modified construction of chain trenches for use with tapering cooking-vessels. Fig. 8 is a horizontal projection of the same, the two cooking-vessels being shown in dotted lines. Fig. 9 shows in end elevation and top plan view the nested cooking-vessels, and in dotted lines the smoke-box and flue inclosed therein, ready for transportation.

The object of this invention is to provide a portable cooking apparatus of simple construction and adapted to be packed into compact form for transportation.

Our improved portable kitchen and cooking apparatus is designed for cooking food for any desired number of persons within certain limits, according to the construction thereof, and may be used for cooking the meals for small or large parties, and it is so constructed as to be put in working condition on any suitable piece of ground in a very short time, and may as readily be packed for transportation.

Our portable kitchen or cooking apparatus consists, essentially, and in its simplest form, of a smoke-box, a chimney, and one or more cooking-vessels, the parts being so constructed as to be nested or inclosed within the smoke-box for ready transportation. Such an apparatus is designed for small parties. For larger parties a number of smoke-boxes may be employed and connected in series, in conjunction with a single chimney; or a single smoke-box provided with a lateral extension or extensions forming a flue and fire chamber or chambers, and adapted to receive a number of cooking-vessels, may be employed. In fact, the apparatus may be variously modified to suit the conditions of use without departing from the spirit or nature of our said invention; and to these ends the invention consists in the combination, with a field-kitchen or portable cooking-stove, of a foldable flue or fire-space extension adapted to fold into the stove or into a smoke-box, a chimney composed of telescopic sections, and one or more cooking-vessels, said parts being constructed to nest or fit into one another, substantially as hereinafter fully described.

The invention further consists in certain details of construction and combination of parts, substantially as hereinafter fully described.

When the portable stove or kitchen is designed for the cooking of the meals for large parties, the apparatus shown in Figs. 1, 2, and 3 may be employed, in which D indicates the smoke-box, which is of rectangular form, preferably polygonal. It is provided with means for securing thereto a chimney, E, that is preferably constructed of sections arranged to telescope one into the other, as shown. At the outer end of the outer section of the chimney a wind-guard, I, is or may be applied, if desired. It is simply a convex piece of sheet metal cut longitudinally at one end, so as to form three legs, J, J, and J', the middle leg, J', being bent inwardly, so that when the guard is applied to the top of the section the legs will straddle the same, the middle leg, J', being on the inside. A wire guard, J², may be secured to the wind-guard to serve as a brace, as more plainly shown in Fig. 1ª. To the opposite ends of the smoke-box D are hinged the end plates or a series of such, which form a chain that may be folded or drawn out. These chains we call the "chain trench," as they form, when straightened out, a trench or flue, which takes the place of the usual trench dug into the ground for field cooking, which labor is thus dispensed with, and the said chains consist of a series of steel or iron plates, C, hinged together at their vertical edges C', and having a portion of their lower horizontal edge cut away to form draft-openings when the apparatus is set up for use, as shown in Figs. 1 and 4, and when the chain trench is of considerable length to accommodate a number of cooking-vessels we preferably cut away a greater portion of the metal at the lower horizontal edge of each alternate plate or link in the chain to provide a greater opening, so that ready access may be had at intervals along the trench to stir up and regulate the fire, as shown in Fig. 1. Instead of these openings, the plates or links C of the chains may have perforations G along their lower horizontal edges when the chain trench is of inconsiderable length, as shown in Fig. 7.

The hinges that connect the plates C together are preferably so constructed as to limit the rotary movement of the plates, so that they may either be extended out in a straight line, or, preferably, in a zigzag line, as shown in Figs. 2, 5, and 8, in order to give the trench greater stability.

The range of utility of the apparatus shown in Figs. 1, 2, and 3 may be greatly increased by duplicating the trench—that is to say, by hinging two sets of chains to opposite sides of the smoke-box D, as shown in Figs. 4 and 7—and in this construction the smoke-box may be enlarged, so as to contain within it an oven, F', Figs. 4, 4ª, 4ᵇ, 4ᶜ, 4ᵈ, 4ᵉ, 5, and 6. In this construction the smoke-box D may be provided with a fuel-door, F⁵, so as to build a fire therein if the heat and products of combustion coming from the trenches or flues are insufficient to heat the oven and cook, roast, or bake the food inclosed therein.

The oven F' consists, essentially, of a sheet-metal casing, whose open front lies against the front wall of the smoke-box, access being had to the interior of the oven by doors F, closing a corresponding or smaller opening in the front wall of the smoke-box D. The oven is of such size as to leave ample room below it for a fire-space and to form flues F² along its sides, rear, and top, so that the heat and products of combustion may freely circulate around it. In order to more evenly distribute the heat and products of combustion that pass through the smoke-box and to more effectually conduct the same around the oven, we apply baffle-plates F⁴, Figs. 4ª to 4ᵈ, in the flues F² on the opposite sides of the oven, so as to cause the heat and products of combustion to follow a zigzag course from the bottom of the smoke-box around the sides of the chimney, as shown by arrows, Fig. 4ᵈ. To the sides of the oven are hinged shelves f, adapted to be swung down to support the roasting or baking pans P, or to be swung up against said oven-sides when the oven is not in use, or when parts of the apparatus are stored or packed therein for transportation, as more plainly shown in Fig. 4ᶜ.

To still further increase the utility of this field-kitchen or portable cooking apparatus, we form in the top plate of the smoke-box any desired number of holes for the reception of various kinds of cooking utensils wherein cooking may be done by the heat and products of combustion circulating in the space or flue F³ above the oven F'.

In this construction of field-kitchen or portable cooking apparatus the chimney E may be applied to the rear wall of the smoke-box at its upper end, as shown in Figs 4ᵇ, 4ᶜ, and 4ᵈ; but when cooking is to be done on top the oven, as above set forth, we preferably connect the chimney E with the top plate of the smoke-box and about centrally thereof, so as to conduct the heat and products of combustion from the fire under the top plate of the smoke-box and under the cooking utensils placed in the holes therein, as will be readily understood, and as shown in Figs. 4 and 5.

In our improved field-kitchen or portable cooking apparatus vessels of any suitable construction may be used in which the cooking of the food is effected. They should, however, for convenience of transportation, be constructed so as to nest one within the other, and they should also be so constructed as to readily fit the smoke-boxes when placed directly thereon, and to fit close to one another when set upon the chain trenches, so as not to allow the escape between them of too great a volume of heat and products of combustion from the fire below.

When cooking-vessels A with parallel sides and ends are used, the series should gradually decrease in size, so as to nest one within the other, as shown in Fig. 1; but such vessels may be of approximately the same length, decreasing only in width, and yet made to nest by making their ends slanting or tapering from the top downward. Cooking-vessels of either of the described forms will nest and at the same time set close to one another, as their side walls are vertical and parallel. Cooking-vessels having the form of a truncated cone or section may, however, be used, and made to set close to one another at their bottom edges or along their lateral walls by sloping the upper edges of the trench-chains C in opposite directions from the hinge-joints, as shown in Figs. 7 and 9, showing them nested; and, finally, cooking-vessels having one of their sides or one of their sides and both ends made slanting may be used, the form of these vessels depending in a great measure on the capacity the apparatus is to have.

The manner in which the apparatus is set up or again packed for transportation may be briefly described to be as follows:

Referring to Fig. 3, which shows the apparatus packed for transportation, the straps S S', which pass through the handles of the largest cooking-vessel A, and through that or those of the lid K for the smallest cooking-vessel in one direction, and around the same in a reverse direction, are removed, next the lids K for all the cooking-vessels, then the telescopic chimney and smoke-box E and D, respectively, in which latter are folded the trench-chains C, as shown in dotted lines in Fig. 2. The smoke-box is next placed upon the ground selected for the kitchen, the trench-chains drawn out, and the chimney attached to the smoke-box, as shown in Fig. 2, the end plates, $C^3$, of the trench-chains serving as doors. The trench or fire-place being now ready, fire may be built therein close to the door end of the trench, and the cooking-vessels containing the food to be cooked placed thereon. If a greater amount of heat is required at the rear or smoke-box end of the trench than that furnished by the fire at the opposite end, the fire may be raked back and supplied with fuel at any desired point, and raked and controlled through the enlarged openings formed by the cut-away portions of the lower edges of the chain-plates; and if it is desired, the operation of cooking may be regulated by shifting the cooking-vessels A from one point on the trench-chains to another, according to the amount of heat required, as will be readily understood.

When it is desired to repack the apparatus, the cooking-vessels A are first nested one within the other. The trench-chains are then folded within the smoke-box D, and the latter placed within the inner cooking-vessel after the smoke-stack E has been detached therefrom, which latter is then telescoped, placed on top of the smoke-box, and the whole covered with the lids K, which are arranged one upon the other in order of their sizes, the smallest one on top, and the whole is strapped together by means of the straps S S', as shown in Fig. 3.

The setting up and repacking of the apparatus shown in Fig. 7 is substantially the same as the corresponding operations described in reference to Figs. 1, 2, and 3, and also of the apparatus shown in Fig. 4, except that in this construction all the parts of the apparatus are contained in the smoke-box and oven, said smoke-box being provided with handles $d$, for the more convenient handling thereof.

Having thus described our invention, what we claim, and desire to secure by Letters Patent, is—

1. In a field-kitchen or portable cooking apparatus, an extensible flue or fire-space for supporting the cooking-vessels, consisting of two series of pivotally-connected plates, substantially as described, for the purposes specified.

2. In a field-kitchen or portable cooking apparatus, the combination, with a smoke-box, of an extensible flue or fire-space for supporting the cooking-vessels, consisting of two series of plates pivotally connected together and to opposite ends of the smoke-box, substantially as and for the purpose specified.

3. In a field-kitchen or portable cooking apparatus, the combination, with a smoke-box, of an extensible flue or fire-space for supporting the cooking-vessels, consisting of two series of plates pivotally connected together and to opposite ends of the smoke-box, and constructed to fold within the same, substantially as and for the purpose specified.

4. In a field-kitchen or portable cooking apparatus, the combination, with a smoke-box, of an extensible flue or fire-space for supporting the cooking-vessels, consisting of two series of plates having a portion of their lower edges cut away to form draft-apertures, said plates being pivotally connected to one another and to the smoke-box, and constructed to fold within the same, substantially as and for the purpose specified.

5. In a field-kitchen or portable cooking apparatus, the combination, with a smoke-box, of an extensible flue or fire-space for supporting the cooking-vessels, consisting of two series of plates pivotally connected together and to opposite ends of the smoke-box, and a telescopic chimney for said smoke-box, said parts being constructed to nest or fold within the smoke-box, substantially as and for the purpose specified.

6. A field-kitchen or portable cooking-stove composed of a smoke-box, D, a foldable flue or fire-space consisting of two series of plates hinged together and to opposite ends of the smoke-box so as to stand on end when drawn out and folding into the same, a chimney, E, constructed of telescopic sections detachably secured to the smoke-box, and a plurality of cooking-vessels constructed to be seated on said foldable plates when drawn out to form the fire-space and draft-flue, said parts being constructed to nest or fit into one another, substantially as described, for the purpose specified.

7. A field-kitchen or portable cooking-stove composed of a smoke-box, D, having an opening in one side, a foldable flue or fire-space consisting of two series of plates, C, hinged together and to opposite ends of the open side of the smoke-box and folding into the same, said plates having a portion of their lower ends cut away to form draft-openings, a chimney, E, constructed of telescopic sections detachably secured to the smoke-box, and a plurality of cooking-vessels constructed to be seated on said foldable flue when drawn out, the end plates, $C^3$, folding toward each other and constituting the doors of the stove or fire-place, said parts being constructed to nest or fit into one another, substantially as and for the purpose specified.

8. A field-kitchen or portable cooking-stove composed of a smoke-box, D, having an opening in one side, a foldable flue or fire-place consisting of two series of plates, C, hinged together and to opposite ends of the open side of the smoke-box and folding into the same, the hinges C' being constructed to limit the rotation of the plates on their hinge-pintles in one direction to form zigzag lines when drawn out or unfolded, the end plates, C³, folding toward each other to form the doors of the draft-flue or fire-space, substantially as and for the purpose specified.

9. A field-kitchen or portable cooking-stove composed of a smoke-box, D, having an opening in one side, of a foldable flue or fire-place consisting of two series of plates, C C³, hinged together and to opposite ends of the open side of the smoke-box and folding into the same, said plates having their upper edges inclined in reversed directions from their hinged joints, in combination with cooking-vessels having the form of a truncated cone in section to be placed upon said reversely-inclined edges of the flue, substantially as and for the purpose specified.

10. A field-kitchen or portable cooking-stove composed of a smoke-box, D, having openings in its sides, foldable flues or fire-places composed of four series of plates, C C³, hinged together and to opposite ends of the open sides of the smoke-box and folding into the openings therein, a chimney, E, composed of telescopic sections detachably secured to the smoke-box, and a plurality of cooking-vessels having the form of truncated cones in section to be placed upon said foldable flues or fire-places, said cooking-vessels nesting one within the other, and containing the chimney E when telescoped and fitting into the smoke-box D, substantially as and for the purpose specified.

In testimony whereof we have hereto set our hands in the presence of two subscribing witnesses.

ALEXANDER LOGIN LINEFF.
WILLIAM JONES.

Witnesses:
ALFRED J. BOULT,
HENRY B. BRIDGE.